(12) United States Patent
Thoma et al.

(10) Patent No.: US 12,071,194 B2
(45) Date of Patent: Aug. 27, 2024

(54) BICYCLE FRAME TUBE

(71) Applicant: Canyon Bicycles GmbH, Koblenz (DE)

(72) Inventors: Vincenz Thoma, Obermaiselstein (DE); Patrick Schmidt, Koblenz (DE); Christian Parmenter, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 479 days.

(21) Appl. No.: 17/488,383

(22) Filed: Sep. 29, 2021

(65) Prior Publication Data

US 2022/0106007 A1    Apr. 7, 2022

(30) Foreign Application Priority Data

Oct. 1, 2020  (DE) ................... 20 2020 105 638.7

(51) Int. Cl.
| | |
|---|---|
| *B62K 19/40* | (2006.01) |
| *B62K 19/06* | (2006.01) |
| *B62M 6/90* | (2010.01) |

(52) U.S. Cl.
CPC ............ *B62K 19/40* (2013.01); *B62K 19/06* (2013.01); *B62M 6/90* (2013.01)

(58) Field of Classification Search
CPC ........ B62K 19/40; B62K 19/06; B62K 19/30; B62M 6/90; B62M 6/80; B62J 43/28
See application file for complete search history.

(56) References Cited

U.S. PATENT DOCUMENTS

| | | | | |
|---|---|---|---|---|
| 9,580,140 | B2* | 2/2017 | Talavasek | ................ B62M 6/60 |
| 11,345,437 | B2* | 5/2022 | Talavasek | ................ B62J 43/28 |
| 11,603,165 | B2* | 3/2023 | Ragland | ................... B62J 43/13 |
| 2017/0190243 | A1* | 7/2017 | Duan | ....................... B62M 6/90 |
| 2018/0072379 | A1 | 3/2018 | Talavasek et al. | |
| 2018/0241022 | A1 | 8/2018 | Nishihara et al. | |
| 2020/0062325 | A1 | 2/2020 | Talavasek et al. | |
| 2020/0062342 | A1 | 2/2020 | Talavasek et al. | |
| 2020/0354017 | A1 | 11/2020 | De La Serna Gonzalez et al. | |

FOREIGN PATENT DOCUMENTS

| | | |
|---|---|---|
| CN | 205872330 U | 1/2017 |
| DE | 69826084 T2 | 1/2005 |
| DE | 102016010338 A1 | 3/2018 |
| DE | 212018000304 U1 | 9/2020 |
| EP | 1982909 A1 | 10/2008 |
| EP | 2423096 A2 | 2/2012 |
| EP | 3372482 A1 | 9/2018 |

\* cited by examiner

*Primary Examiner* — Jacob D Knutson
*Assistant Examiner* — Marlon A Arce
(74) *Attorney, Agent, or Firm* — The Webb Law Firm

(57) ABSTRACT

The present disclosure is related to a field of e-bikes that discloses a bicycle frame tube, which may be a down tube of a bicycle frame. The down tube includes at the bottom-bracket-side end a battery opening facing in the longitudinal direction of the down tube such that a battery can be inserted into the opening from below. Further, the battery may be switched on and off by a switch provided at the battery. The bicycle frame tube may include a switch opening such that a mechanical switch with an operating element may be arranged in the switch opening to mechanically actuate the on/off switch of the battery. Furthermore, a charging plug as well as a charging condition indicator may be provided at the lower end of the battery or the battery housing of the battery.

13 Claims, 3 Drawing Sheets

BICYCLE FRAME TUBE

CROSS-REFERENCE TO RELATED APPLICATION

This application claims priority to German Patent Application No. 20 2020 105 638.7 filed Oct. 1, 2020, the disclosure of which is hereby incorporated by reference in its entirety.

BACKGROUND

Field of the Invention

The disclosure relates to a bicycle frame tube, in particular a down tube of a bicycle frame.

Technical Background

In the case of e-bikes it is known to arrange the battery in the bicycle frame. Frequently, the battery is arranged in the area of the down tube of the bicycle frame. For example, the battery is fixed to the outside of the down tube, wherein the down tube can include a recess facing to the outside, in which recess the battery is fixed. The battery or the battery housing is essentially arranged outside the lower tube. For switching-on and off purposes, such batteries can include a corresponding switch directly located at the battery or in the battery housing.

From DE 10 2016 010 338 and US2020/0062325 it is further known to arrange a battery inside the down tube. For this purpose, the down tube comprises at its bottom-bracket-side end a battery opening facing in the longitudinal direction of the down tube. The battery can be inserted into said opening from below. For switching the battery on and off, the battery arranged in the down tube is connected to an additional electric switch via an electric cable. The electric switch can be arranged at the handlebar or an outside of a bicycle frame tube, for example. The conventional arrangement of the battery inside the down tube is disadvantageous in that an electric connection to the switch must be provided.

SUMMARY

It is an object of the disclosure to provide a bicycle frame tube inside which a battery can be arranged, which battery can be easily and reliably switched on and off.

According to a non-limiting embodiment or aspect, provided is a bicycle frame tube, in particular a down tube.

The bicycle frame tube according to a non-limiting embodiment, which may be a down tube of a bicycle frame, includes a battery opening for inserting or removing a battery. Here, the battery can, of course, include a battery housing which includes holding fixtures for fixing it inside the bicycle frame tube, for example. According to a non-limiting embodiment, the bicycle frame tube further includes a switch opening. A mechanical switch may be arranged in the switch opening. According to another non-limiting embodiment, the on/off switch of the battery can thus be mechanically actuated by means of a mechanical switch arranged in the switch opening of the bicycle frame tube. An electric connection between an electric switch and the battery is not required. This allows the battery to be switched on and off. A plug contact as required in the case of an electric connection, which plug contact is contacted when the battery is inserted, is not required. Thus, this contact cannot be damaged or corrode, for example.

In another non-limiting embodiment or aspect, the mechanical switch includes a switching element. With the battery mounted, i.e. arranged in the bicycle frame tube, the switching element may mechanically act upon an on/off switch provided at the battery. The on/off switch can also be arranged at a battery housing of the battery. In other non-limiting embodiments, the battery includes, besides the battery housing, a plurality of cells, a control electronic system, holding elements and the like. The switching element may mechanically act upon the on/off switch. The on/off switch of the battery may be a pressure-actuated switch and not a slide switch.

According to other non-limiting embodiments or aspects, the mechanical switch may include an operating element arranged on an outside of the bicycle frame tube for actuating the switching element. According to another non-limiting embodiment or aspect, the operating element is also an operating element adapted to be actuated by pressure. The operation may be performed by pressing the operating element using a finger. According to another non-limiting embodiment or aspect, the operating element is integrally formed with the switching element.

In other non-limiting embodiments or aspects, the operating element is held in the switch opening of the bicycle frame tube via a holding element. The holding element may be configured such that it holds the operating element in an initial position. When the user presses the operating element, the latter can be moved from the initial position into the actuation position in which the on/off switch of the battery is mechanically switched. Preferably, the holding element is configured such that the operating element is automatically returned into the initial position after the actuation. The holding element may be at least partially made from a plastic material. The operating element itself can be made from a harder plastic material. In some non-limiting embodiments or aspects, the holding element includes an elastically configured connecting element which supports the operating element.

According to other non-limiting embodiments or aspects, the operating element is arranged in a laterally offset manner relative to a center plane of the bicycle frame tube. In the mounted condition, the center plane of the bicycle frame tube is the vertical center plane of the bicycle frame relative to which the bicycle frame is essentially symmetrically configured. An offset arrangement of the operating element relative to the center plane, as provided according a non-limiting embodiment, allows the operating element to be more easily accessible when riding the bicycle. In other non-limiting embodiments or aspects, the operating element is asymmetrically arranged in the switch opening. This allows the switch opening itself to be arranged symmetrically relative to the center plane with the operating element being offset.

In other non-limiting embodiments or aspects, the mechanical switch is arranged in an area which is easily accessible even when riding the bicycle. The mechanical switch may be arranged in an area of the bicycle frame located in the vicinity of a head tube of the bicycle frame. With respect to the length of the bicycle frame tube in which the battery is arranged, the mechanical switch may be arranged in a front third of the bicycle frame tube, i.e. in the third of the bicycle frame tube facing the head tube.

According to other non-limiting embodiments or aspects, the battery opening is arranged in the longitudinal direction of the bicycle frame tube. Thus, the battery may be inserted or removed in the longitudinal direction of the bicycle frame tube. When the bicycle frame tube is a down tube, the battery opening may be arranged on the bottom bracket side. The battery opening may be provided by the bottom-bracket-side end of the down tube. The battery can thus be inserted through the battery opening from below in the area of the bottom bracket.

In other non-limiting embodiments or aspects, a bicycle frame may include a motor accommodating unit for an electric motor. The bicycle frame includes a plurality of frame tubes, such as a top tube, a down tube, a saddle tube and a head tube. At least one of the frame tubes is configured as described and may include the mechanical switch described above. In some non-limiting embodiments or aspects, a battery is arranged in or adapted to be inserted into the bicycle frame tube, which battery is electrically connected to the electric motor. The battery, or a battery housing of the battery, may include an on/off switch which cooperates with the mechanical switch, or with the switching element of the mechanical switch. The on/off switch of the battery may be a pressure-actuated switch.

According to another non-limiting embodiment or aspect, a battery is adapted to be inserted into a bicycle frame tube from below, the bicycle frame tube being a down tube. According to other non-limiting embodiment or aspect, a charging plug as well as a charging condition indicator are provided at the lower end of the battery, or the battery housing of the battery. The lower end of the battery is the end arranged in the vicinity of the bottom bracket when the battery is inserted in the down tube. The charging plug allows for connecting an electric cable for charging the battery. According another non-limiting embodiment or aspect, the charging condition indicator is provided adjacent to the charging plug. The charging condition indicator may include a plurality of LEDs. Depending on the charging condition, a different number of LEDs are illuminated. Arranging the charging condition indicator in the immediate vicinity of the charging plug allows the user to obtain a visual feedback concerning the charging condition of the battery directly when plugging in the charging plug without having to look at a different unit or to switch on the system or to connect a corresponding indicating system, for example.

According to another non-limiting embodiment or aspect, the charging plug as well as the charging condition indicator are arranged behind a cover. This cover protects both the charging condition indicator and the charging plug against contamination during operation.

In other non-limiting embodiments or aspects, it is not required that the charging condition indicator provided directly next to the charging plug is visible since during operation the charging condition of the battery may be indicated on a display arranged at the handlebar. This allows the charging condition of the battery to be easy to read at any time when riding the bicycle.

In some non-limiting embodiments or aspects, the battery includes an on/off switch as described above. Further, the battery includes, besides the charging plug, a plug for connecting to the electric motor. With the motor plug plugged in, the system can be switched on with the aid of the on/off switch. At the same time, the display which may be arranged at the handlebar is switched on such that the bicycle is ready to start. In this condition, the charging plug and the charging condition indicator may be covered by the cover.

In some non-limiting embodiments or aspects, once the charging plug is plugged in, the charging condition indicator indicates the charging condition. If neither the motor plug nor the charging plug is plugged in, it is possible to query the current charging condition of the battery by pressing the on/off switch of the battery. The charging condition is then indicated by the charging condition indicator.

According to another non-limiting embodiment or aspect, the charging plug and the arrangement of the charging condition indicator is combined with the present disclosure relating to the arrangement of a mechanical switch in the bicycle frame tube, and it is further supported by other non-limiting embodiments.

BRIEF DESCRIPTION OF THE DRAWINGS

Hereunder the disclosure will be explained in detail with reference to the accompanying drawings in which.

DETAILED DESCRIPTION

Figure 1:
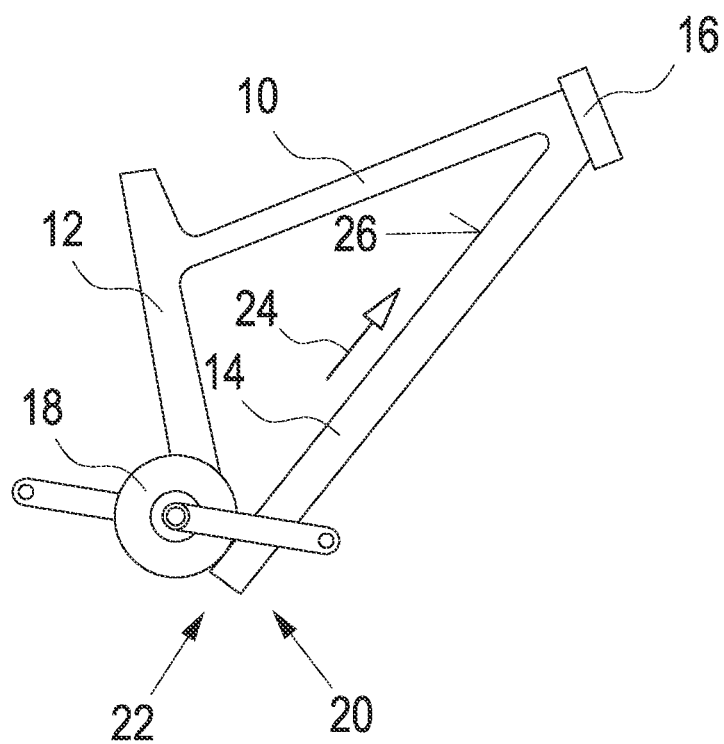
FIG. 1 shows a schematic side view of a bicycle frame.

A bicycle frame usually comprises a top tube 10, a saddle tube 12 connected to the top tube 10, a down tube 14 as well as a head tube 16 connected to the top tube 10 and the down tube 14. Further, a bottom bracket or motor housing 18 is provided which serves for accommodating an electric motor of the bottom bracket. Other frame geometries are also known. In the illustrated FIG. 1, the down tube 14 is arranged such that a bottom-bracket-side end 20 of the down tube 14 comprises a battery opening 22. The battery opening 22 is thus arranged relative to a longitudinal direction 24 of the down tube 14. In the illustrated FIG. 1, a battery can be inserted into the battery opening 22 of the down tube 24 from below in the longitudinal direction 24.

Figure 2:
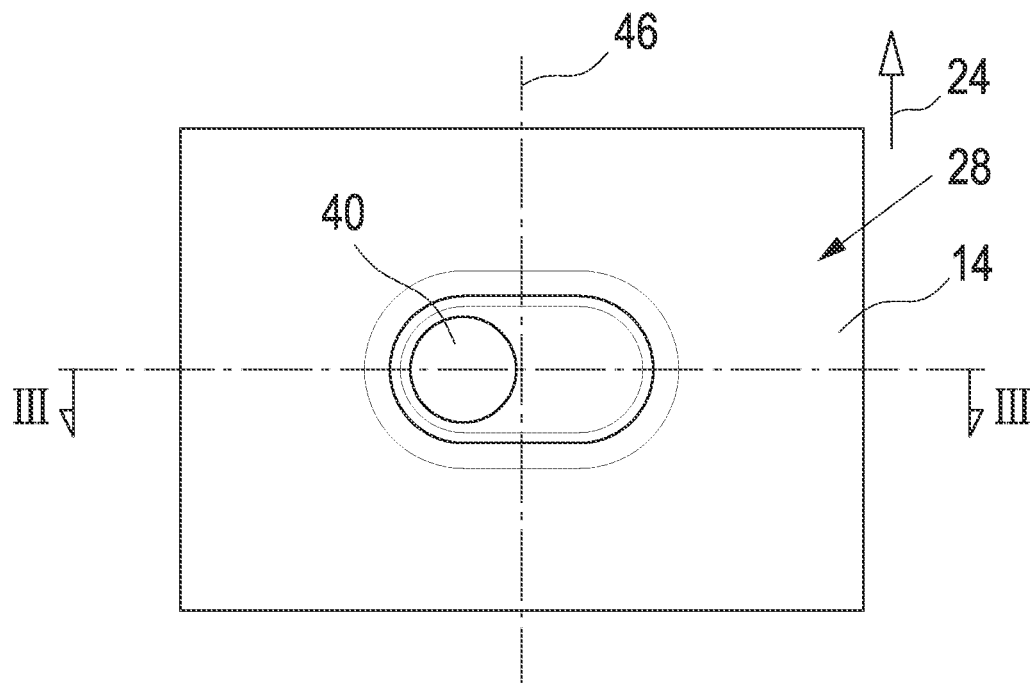
FIG. 2 shows a schematic top view of a down tube in the area of the switch.
Figure 3:
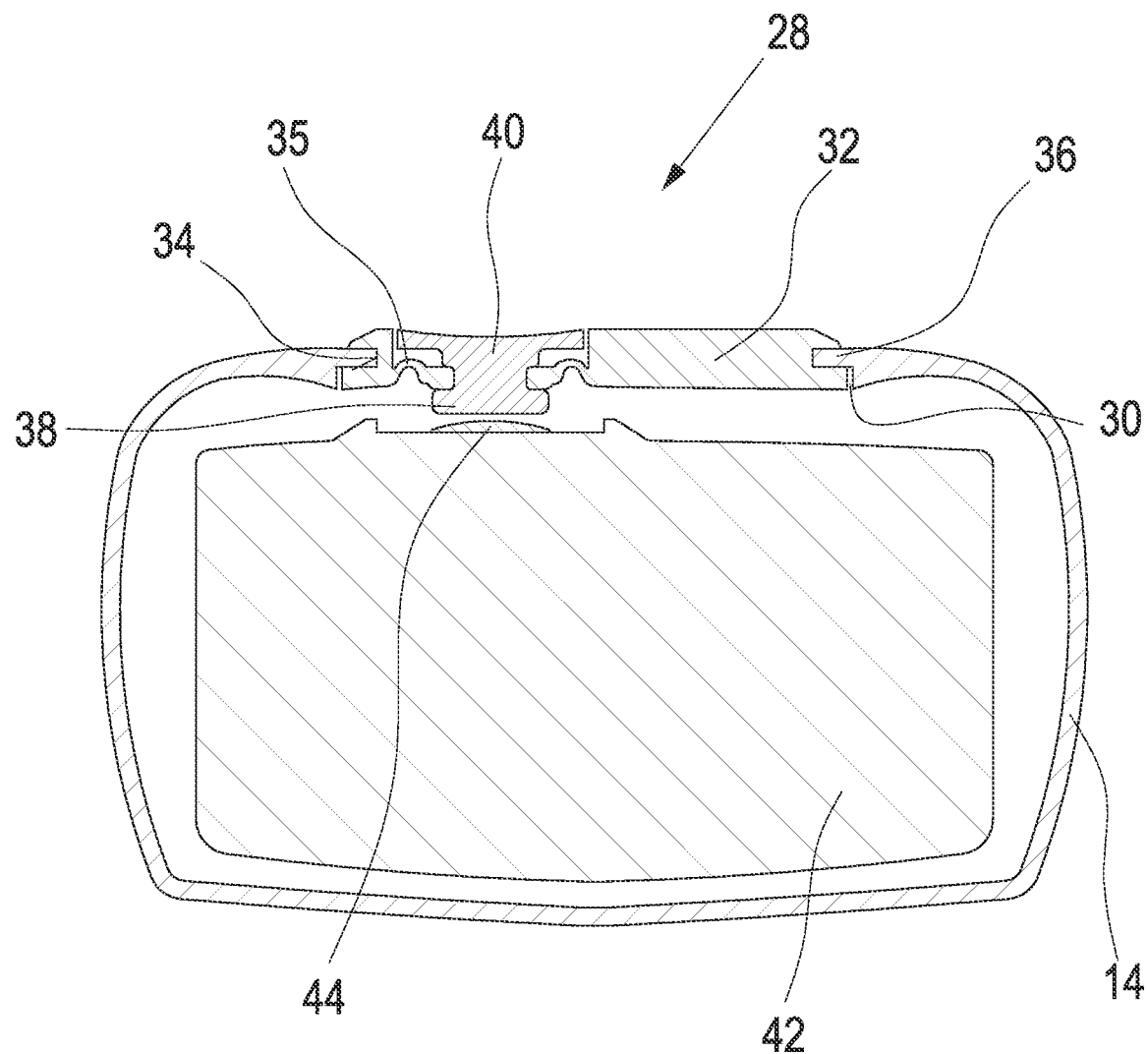
FIG. 3 shows a schematic sectional view of the down tube along the line III-III of FIG. 2.

With reference to FIG. 2, a mechanical switch 28 is arranged at an upper side 26 of the down tube 14 in an area of the down tube 14 facing in the direction of the head tube 16. The mechanical switch 28 is arranged in a switch opening provided in the down tube 14. With reference to FIG. 3, the switch 28 comprises a holding element 32 made from an elastic material. The holding element 32 includes a groove 34 which cooperates with a boss 36. Thereby, the holding element 32 is held in the opening 30. The holding element 32 supports a switching element 38 which, in FIG. 3, is integrally formed with an operating element 40. The holding element 32 includes a connecting element 35 made from an elastic material and supporting the operating element 40. On its upper side the operating element 40 includes a depression such that the operating element 40 can be easily moved, by a finger, inward towards a battery 42 arranged in the down tube 14. Due to the elasticity of the holding element 32 the operating element can be pressed inward from its initial position for actuating an on/off switch 44 of the battery 42 and automatically returns from the actuating position into the initial position.

With reference to FIG. 2, the operating element is asymmetrical or laterally offset relative to a frame center plane 46. In FIG. 2, the switch opening 32 is essentially oval or has a larger extension vertically to the frame center plane 46 than in the longitudinal direction 24 of the down tube 14. Thus, the switch opening 30 is symmetrical relative to the frame center plane 46.

Figure 4:
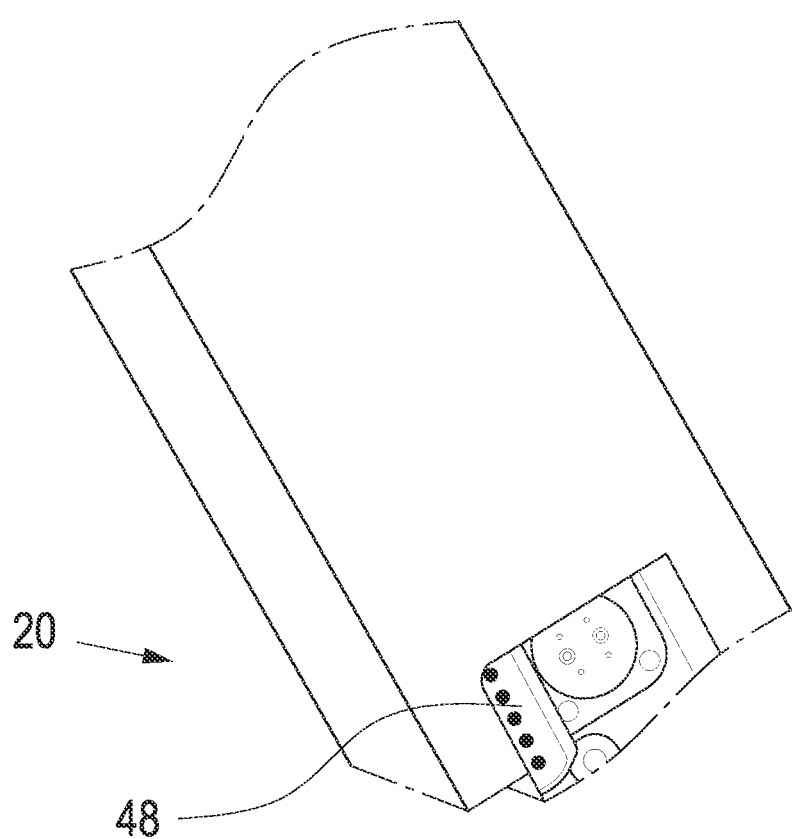
FIG. 4 shows a schematic side view of the down tube in the area of the bottom bracket.

With reference to FIG. 4, a charging plug 46 is provided in the area of the lower end 20 of the down tube, i.e. in the bottom-bracket-side area of the down tube. The charging plug 46 forms part of the battery 42. By plugging a charging cable into the charging plug 46 the battery 42 can be charged. A charging condition indicator 48 including a plurality of LEDs is located directly next to the charging plug 46. Both the charging plug 46 and the charging condition indicator 48 can be closed by a lid or a cover which are not illustrated.

When an electric cable is plugged into the charging plug 46 the charging condition indicator 48 indicates the current charging condition of the battery 42.

Further, with the motor plug not plugged in, i.e. when there is no connection between the battery 42 and the electric motor, it is possible to actuate the operating element 40 or to directly actuate the on/off switch 44. Thus, even when no charging cable is arranged in the charging plug 46, the charging condition is indicated via the charging condition indicator 48. This can easily be realized even with the battery being dismounted, for example.

The invention claimed is:

1. A bicycle frame down tube comprising:
   a battery opening for inserting or removing a battery;
   a switch opening; and
   a mechanical switch arranged in the switch opening, wherein the mechanical switch comprises a switching element, and wherein the switching element mechanically acts upon an on/off switch provided on the battery when the battery is mounted inside the frame down tube.

2. The bicycle frame down tube according to claim 1, wherein the mechanical switch comprises an operating element arranged on an outside of the bicycle frame down tube for actuating the switching element.

3. The bicycle frame down tube according to claim 1, wherein an operating element is integrally formed with the switching element.

4. The bicycle frame down tube according to claim 2, wherein the operating element is held in the switch opening via a holding element.

5. The bicycle frame down tube according to claim 4, wherein the holding element is configured such that it holds the operating element in an initial position and automatically returns the operating element from an actuating position into the initial position.

6. The bicycle frame down tube according to claim 4, wherein the holding element is at least partially made from an elastic material or is of an elastic configuration, wherein a connecting element supports the operating element.

7. The bicycle frame down tube according to claim 2, wherein the operating element is laterally offset relative to a center plane of the bicycle frame down tube.

8. The bicycle frame down tube according to claim 2, wherein the operating element is asymmetrically arranged in the switch opening.

9. The bicycle frame down tube according to claim 1, wherein the mechanical switch is arranged in an area of the bicycle frame down tube which is arranged in the vicinity of a head tube of a bicycle frame.

10. The bicycle frame down tube according to claim 1, wherein the battery opening is arranged in the longitudinal direction of the bicycle frame down tube.

11. The bicycle frame down tube according to claim 1, wherein the battery opening is arranged on a bottom bracket side of the bicycle frame down tube.

12. A bicycle frame comprising:
    a motor accommodating unit for accommodating an electric motor; and
    a plurality of frame tubes, wherein at least one of the frame tubes of the plurality of frame tubes is configured as a bicycle frame tube, and wherein at least one of the plurality of frame tubes is a frame down tube, wherein the frame down tube comprises:
    a battery opening for inserting or removing a battery;
    a switch opening; and
    a mechanical switch arranged in the switch opening, wherein the mechanical switch comprises a switching element, and wherein the switching element mechanically acts upon an on/off switch provided on the battery when the battery is mounted inside the frame down tube.

13. The bicycle frame according to claim 12, wherein, when the battery is located in the frame down tube, the battery is electrically connected to the electric motor.

* * * * *